United States Patent [19]

Tajima et al.

[11] Patent Number: 4,638,223
[45] Date of Patent: Jan. 20, 1987

[54] MOTOR DRIVING CIRCUIT

[75] Inventors: Shigeru Tajima, Kanagawa; Toshiya Nakabayashi, Tokyo, both of Japan

[73] Assignee: Sony Corporation, Tokyo, Japan

[21] Appl. No.: 738,305

[22] Filed: May 28, 1985

[30] Foreign Application Priority Data

Jun. 7, 1984 [JP] Japan ................................ 59-116944

[51] Int. Cl.$^4$ ............................................. H02P 6/02
[52] U.S. Cl. .................................. 318/254; 318/138; 318/439
[58] Field of Search .................. 318/254 A, 254, 138, 318/439, 301, 307, 309, 310, 311, 312, 313, 317, 326, 327, 599, 811

[56] References Cited

U.S. PATENT DOCUMENTS

| 3,586,949 | 6/1971 | Spear | 318/326 X |
| 4,284,942 | 8/1981 | Bigley et al. | 318/307 X |
| 4,390,826 | 6/1983 | Erdman et al. | 318/254 X |
| 4,472,666 | 9/1984 | Akeda et al. | 318/254 |
| 4,527,102 | 7/1985 | Gotou | 318/254 |
| 4,546,293 | 10/1985 | Peterson et al. | 318/254 |

FOREIGN PATENT DOCUMENTS 54-8818  1/1979  Japan ................................ 318/254

Primary Examiner—William M. Shoop, Jr.
Assistant Examiner—Bentsu Ro
Attorney, Agent, or Firm—Vorys, Sater, Seymour & Pease

[57] ABSTRACT

A voltage has a level which depends on rotational speed of a motor. The voltage is applied to the motor to energize the motor. A current through the motor is sensed. The level of the voltage is adjusted in accordance with the sensed current.

2 Claims, 5 Drawing Figures

MOTOR DRIVING CIRCUIT

BACKGROUND OF THE INVENTION

1. Field of the Invention

This invention generally relates to a motor driving circuit. This invention specifically relates to a driving circuit for a brushless dc motor used in electrical equipment, such as a tape recorder and a video tape recorder (VTR).

2. Description of the Prior Art

Ways of driving a dc motor are conventionally of two types, that is, the constant-voltage type and the constant-current type. Structures for driving a dc motor are conventionally of two types, that is, the series-regulator type and the switching-regulator type. Since the switching-regulator type is more efficient than the series-regulator type, the former is widely used.

FIG. 1 shows a conventional motor driving circuit of the constant-voltage switching-regulator type which uses pulse-width modulation (PWM).

In the circuit of FIG. 1, a brush-less dc motor 1 includes three-phase coils or windings 2, 3, and 4, and a rotor (not shown). A generator 5 is associated with the rotor to generate a signal indicative of the rotational speed of the rotor. This rotational speed signal is fed to a servo circuit 8 via an amplifier 7. The servo circuit 8 generates a control signal Sc which depends on the rotational speed of the rotor. This control signal Sc is applied to a PWM circuit 10 via a linear amplifier 9. The PWM circuit 10 generates a pulse signal whose pulse width varies as a function of the rotational speed of the rotor. The pulse signal having PWM pulses is applied to the base of a power driving transistor 11 so that the transistor 11 is switched on and off in response to the PWM pulses. Thus, the voltage at the collector of the transistor 11 is in the form of pulses reflecting the PWM pulses. The emitter of the transistor 11 is connected to the positive terminal of a constant voltage source (not shown). The collector of the transistor 11 is connected through a coil 13 to a common junction O of the motor windings 2, 3, and 4. The motor windings 2, 3, and 4 are connected to the negative terminal of the constant voltage source, that is, to the ground, via switches 17, 18, and 19 respectively in a switch circuit 16. The cathode of a flywheel diode 12 is connected to the junction between the transistor 11 and the coil 13. The anode of the flywheel diode 12 is grounded. One terminal of a capacitor 14 is connected to the common junction O of the motor windings 2, 3, and 4. The other terminal of the capacitor 14 is grounded. The combination of the coil 13 and the capacitor 14 constitutes a smoothing circuit which converts the collector pulse voltage to substantially a constant voltage applied to the common junction O of the motor windings 2, 3, and 4. It should be noted that the level of the voltage applied to the common junction O depends on the rotational speed of the rotor, since the width of the pulses from the PWM circuit 10 varies as a function of the rotational speed of the rotor. In operation, the coil 13 develops counter-electromotive force. The flywheel diode 12 allows the counterelectromotive force to be used. Specifically, the counterelectromotive current flows through the diode 12 and the capacitor 14 so that the capacitor 14 is charged with the current.

An angular position sensor 6 is associated with the rotor of the motor 1 to generate a signal indicative of the angular position of the rotor. This position signal is applied to a control circuit 15. The control circuit 15 generates control pulse signals in sequence depending on the angular position of the rotor. These control pulse signals are applied to the switch circuit 16 so that the switches 17, 18, and 19 are closed sequentially for a predetermined interval in terms of the angle of the rotor. Accordingly, currents flow through the motor windings 2, 3, and 4 in turn.

In the case of VTR's and tape recorders, variations in the amount of recorded or non-recorded portions of tape cause changes in the load on the motor 1 which would result in variations in the torque output of the motor 1. A servo or feed-back loop including the servo circuit 8 adequately removes and prevents the variations in the motor torque output caused by the tape amount variations. Switching action of the switches 17, 18 and 19 causes ripples to develop in the motor torque output for the following reason. At moments of switching of the switches 17, 18, and 19, an inadequate level of current flows through the motor windings 2, 3, and 4, reducing the motor torque output. This reduction of the motor torque output causes a torque ripple. In the case where the motor 1 constitutes a drum motor of a VTR, such a motor torque ripple results in adverse phenomena, for example, jitter.

SUMMARY OF THE INVENTION

It is an object of this invention to remove ripples from the torque output of a motor used with a PWM constant-voltage driving circuit.

In accordance with this invention, a PWM constant-voltage driving circuit includes a servo or feed-back loop for controlling the PWM circuit in response to the current through a brush-less motor.

This invention effectively removes ripples from the motor torque output caused by switching of the current through the motor windings.

DESCRIPTION OF THE PREFERRED EMBODIMENTS

Figure 1:
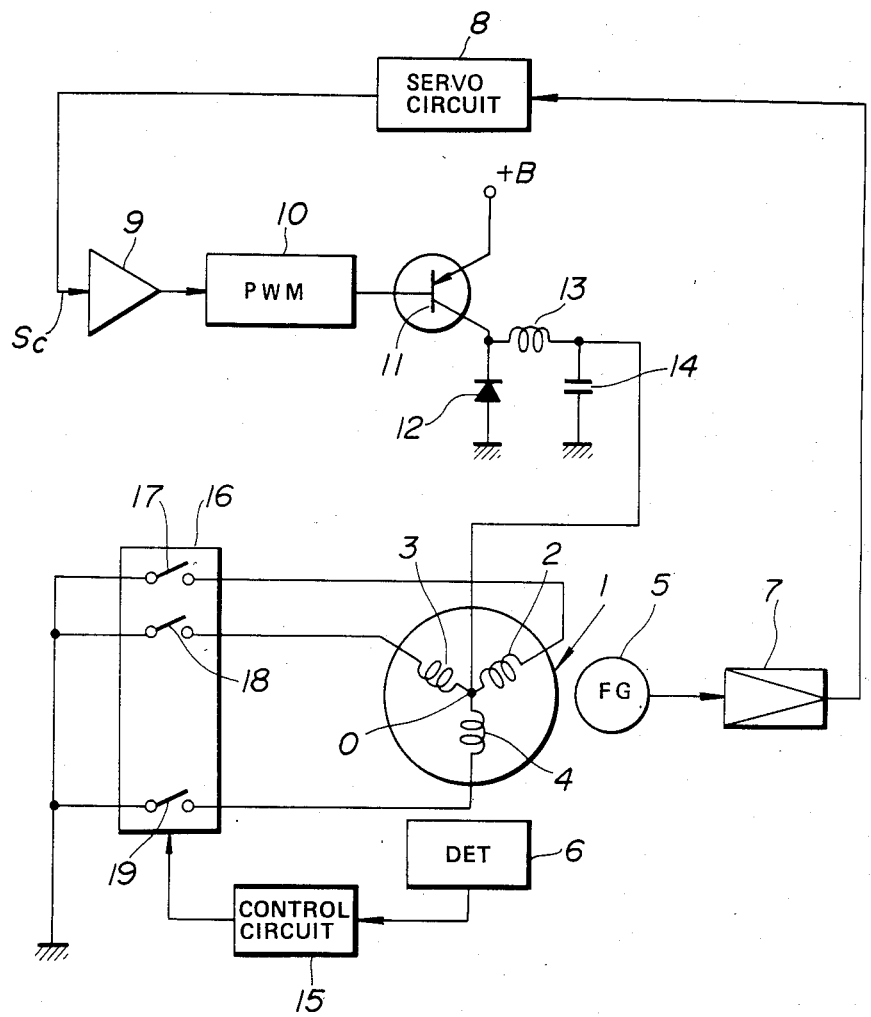
FIG. 1 is a schematic diagram of a conventional PWM constant-voltage driving circuit.
Figure 2:
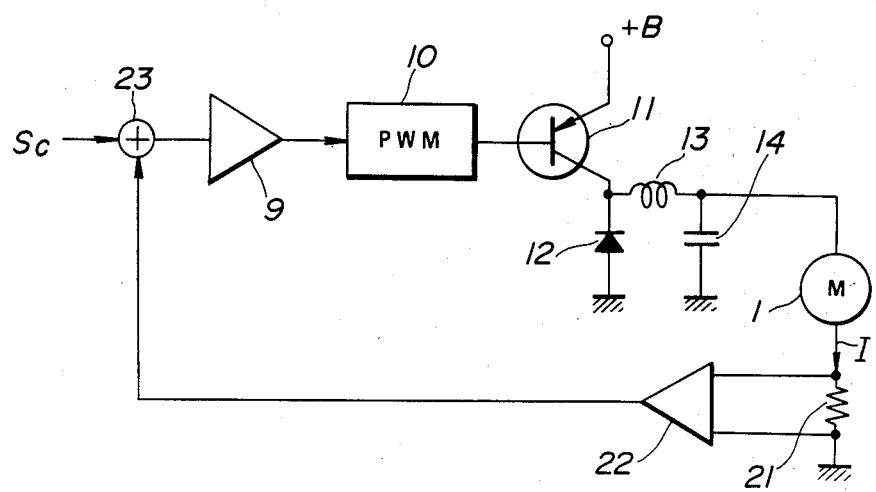
FIG. 2 is a schematic diagram of a general embodiment of this invention.

FIG. 2 shows a driving circuit in which this invention is applied to the circuit of FIG. 1. Elements of FIG. 2 corresponding to the elements of FIG. 1 are denoted by the same reference characters as those in FIG. 1. A motor 1 is shown in FIG. 2 more simply than in FIG. 1. Illustrations of the servo loop and the switch circuit 16 of FIG. 1 are omitted from FIG. 1.

In the circuit of FIG. 2, a fixed resistor 21 is connected in series with the motor 1 to generate a voltage proportional to the current I through the motor 1. This voltage developing across the resistor 21 is amplified by a linear amplifier 22 and is then applied to an adding circuit 23. The control signal Sc outputted from the servo circuit 8 (see FIG. 1) is also applied to the adding circuit 23. The adding circuit 23 outputs a voltage whose amplitude is equal to the sum of the amplitudes of the control signal Sc and the output from the amplifier 22. This voltage output from the adding circuit 23 is fed to the PWM circuit 10 through the amplifier 9 so that the PWM circuit 10 is controlled in response to the voltage output from the adding circuit 23.

At moments of switching of the switches 17, 18, and 19 (see FIG. 1), if the current I through the motor 1 decreases, the voltage across the resistor 21 drops. This voltage drop allows the width of pulses from the PWM circuit 10 to increase, so that the voltage applied to the motor 1 will be enhanced. Accordingly, the decrease in the current I through the motor 1 is compensated for and thus a ripple is removed from the torque output of the motor 1.

As described above, this invention detects the current I through the motor 1 by means of the resistor 21 and controls the voltage to the motor 1 in response to the detected current I. Accordingly, the driving circuit of FIG. 2 has a structure in which a constant-current driving circuit is added to the constant-voltage driving circuit of FIG. 1. This added constant-current driving circuit forms a servo or feed-back loop serving to remove the torque ripples.

Specifically, the resistor 21 is connected between the capacitor 14 and the motor winding common junction O (see FIG. 1). The resistor 21 may be connected between the ground and a common junction of the switches 17, 18, and 19 (see FIG. 1). In other words, the resistor 21 is disposed in locations where the resistor 21 is connected in series with the motor 1.

Figure 3:
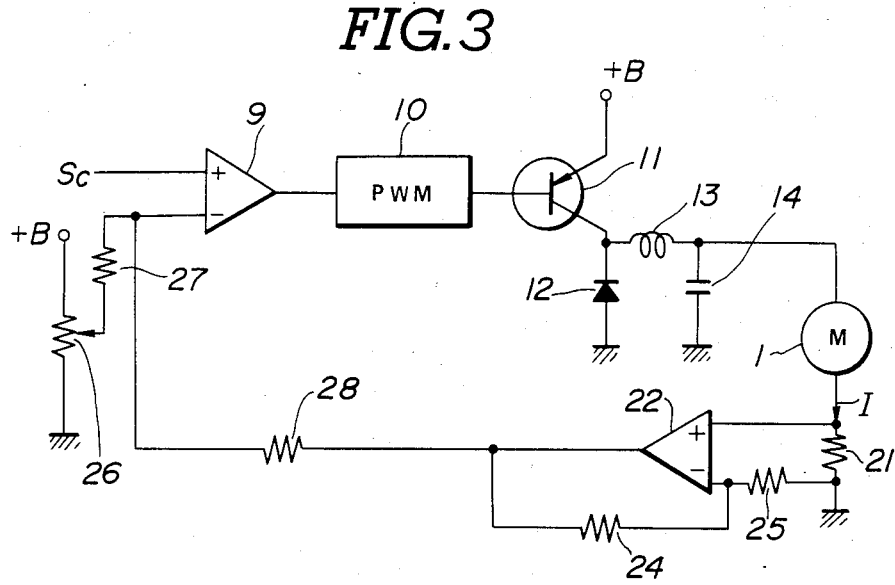
FIGS. 3, 4, and 5 are schematic diagrams of first, second, and third specific embodiments of this invention respectively.
Figure 4:
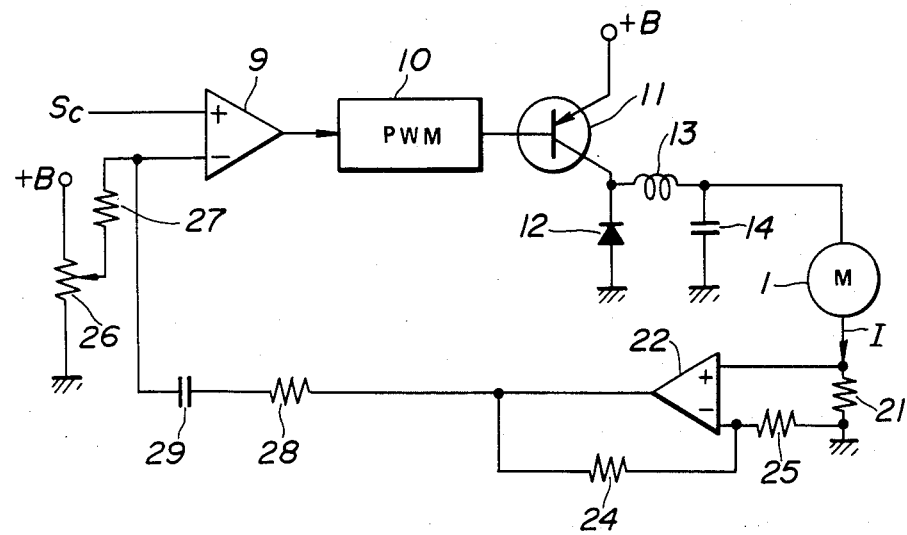
Figure 5:
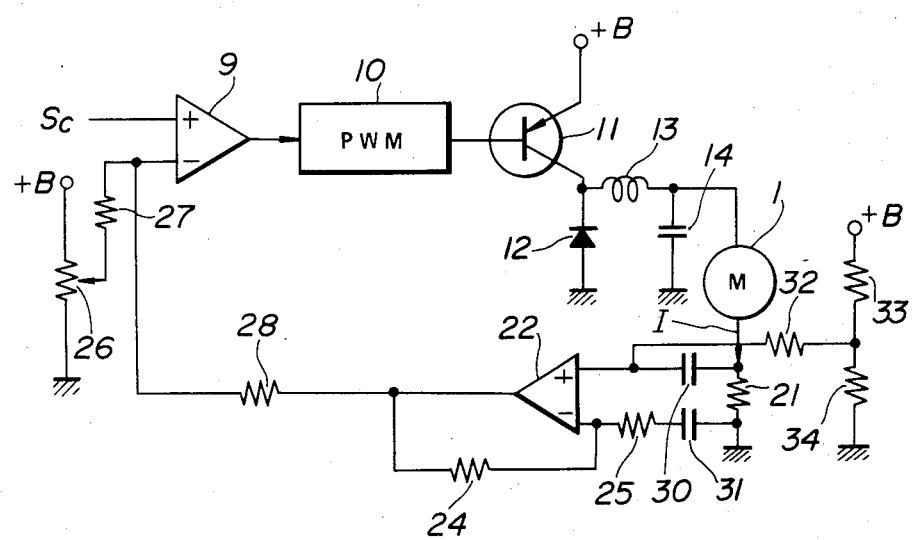

FIGS. 3, 4, and 5 show first, second, and third specific embodiments of this invention respectively. Elements of FIGS. 3, 4, and 5 corresponding to the elements of FIG. 2 are denoted by the same difference characters as those in FIG. 2. Corresponding elements are denoted by the same reference characters throughout the drawings of FIGS. 3, 4, and 5. In the circuits of FIGS. 3, 4, and 5, the linear amplifiers 9 and 22 are composed of operational amplifiers.

In the embodiment of FIG. 3, fixed resistors 24 and 25 connected to the linear amplifier 22 determine the gain of the amplifier 22. A variable resistor or potentiometer 26 connected across the constant voltage source generates an adjustable bias voltage applied to the linear amplifier 9 via a fixed resistor 27. This bias voltage adjustably determines the operating characteristics of the motor 1, such as an operating point of the motor 1. The resistor 27 and a fixed resistor 28 connected between the amplifiers 9 and 22 cooperate to determine the level of feed back via the constant-current driving servo loop.

The embodiment of FIG. 4 is similar to the embodiment of FIG. 3 except for the following design change. The embodiment of FIG. 4 includes a capacitor 29 disposed in a part of the constant-current driving servo loop from the amplifier 22 to the amplifier 9. Specifically, the capacitor 29 is connected between the resistor 28 and the amplifier 9.

In the embodiment of FIG. 3, the amplifiers 9 and 22 are dc-coupled to each other, so that the feed-back signal has dc and low-frequency components. Such dc and low-frequency components are useless in removing motor torque riples, since these ripples have frequencies higher than a certain value. In view of this, the embodiment of FIG. 4 includes the capacitor 29 to cut off dc and low-frequency components of the feed-back signal, so that this embodiment removes motor torque ripples while preventing the dc and low-frequency components from affecting the control of the motor 1. The cut-off frequency depending on the capacitance of the capacitor 29 is chosen on the basis of the frequency of switching of the switches 17, 18, and 19 (see FIG. 1). In the case of a drum motor of VTR, this cut-off frequency is preferably about several tens of Hz.

In the embodiment of FIG. 5, the voltage across the resistor 21 is applied to the amplifier 22 through capacitors 30 and 31, and a network of fixed resistors 32, 33, and 34 connected to the constant voltage source applies a bias voltage to the non-inverting input terminal of the amplifier 22.

In the embodiments of FIGS. 3 and 4, a common power source for activating the amplifiers 9 and 22, and the transistor 11 is necessary to expose them to the same fluctuation in the power supply voltage. In some cases, the power supply voltage applied to the transistor 11 should be higher than the power supply voltage applied to the amplifier 22. The embodiments of FIGS. 3 and 4 do not meet such a demand. The embodiment of FIG. 5 meets such a demand, since the resistor 21 is ac-coupled to the amplifier 22 to transmit only voltage variations to the amplifier 22 and thereby the amplifier 22 and the transistor 11 can be activated by separate power sources respectively.

What is claimed is:

1. A driving circuit for a motor, comprising:
    (a) means for generating a control signal which depends on rotation of the motor;
    (b) a PWM circuit outputting pulses which depend on the control signal;
    (c) means for generating a voltage which depends on the pulses from the PWM circuit;
    (d) means for applying the voltage to the motor;
    (e) means for sensing a current through the motor;
    (f) means for controlling the PWM circuit on the basis of the sensed current and the control signal; and
    (g) means for cutting off dc and low-frequency components of the sensed current.

2. A driving circuit for a motor, comprising:
    (a) means for sensing rotational speed of the motor;
    (b) means for generating a voltage whose level depends on the sensed rotational speed of the motor;
    (c) means for applying the voltage to the motor to energize the motor;
    (d) means for sensing a current through the motor;
    (e) means for adjusting the level of the voltage in accordance with the sensed current, and
    (f) means for cutting off dc and low-frequency components of the sensed current.

* * * * *